April 1, 1930.  E. HANDSCHIN  1,752,904
SYSTEM OF INDUCTION MOTOR CONTROL
Filed Aug. 15, 1928
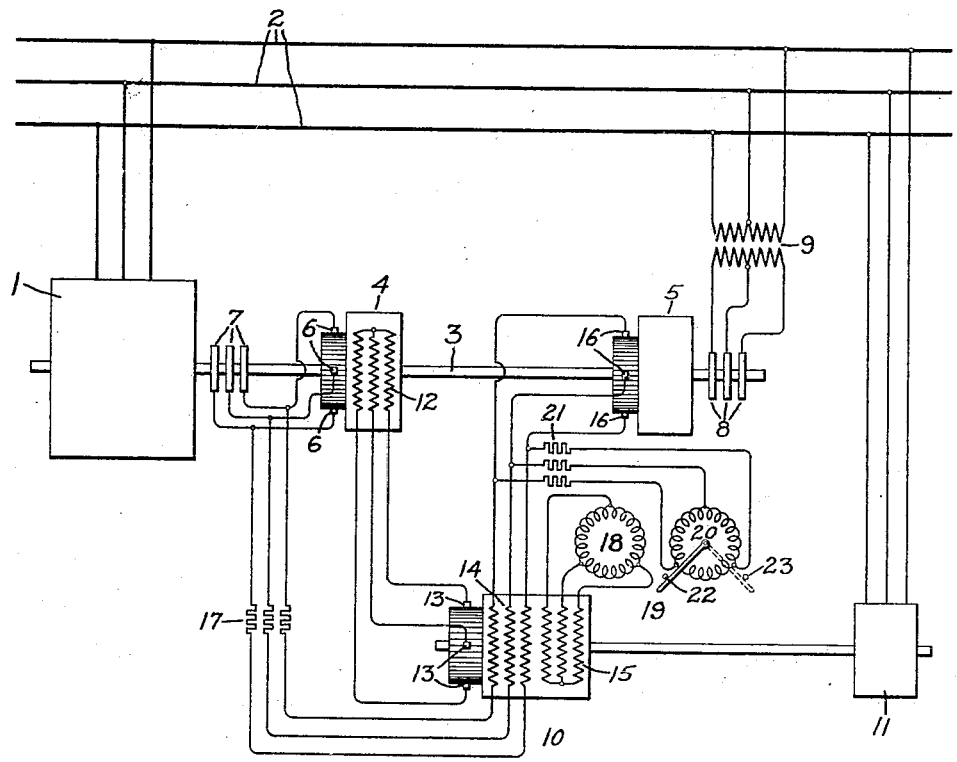
Inventor:
Eugen Handschin
by Charles E. Tullar
His Attorney Patented Apr. 1, 1930

1,752,904

UNITED STATES PATENT OFFICE

EUGEN HANDSCHIN, OF BADEN, SWITZERLAND, ASSIGNOR TO GENERAL ELECTRIC COMPANY, A CORPORATION OF NEW YORK

SYSTEM OF INDUCTION-MOTOR CONTROL

Application filed August 15, 1928, Serial No. 299,847, and in Germany September 1, 1927.

My invention relates to the control of induction motors, especially to a system of control in which the torque of the motor is regulated independently of the speed, and has for its object the provision of means to prevent over-speeding of the motor.

It is well known to control induction motors by means of regulating machines concatenated therewith so that the torque will remain constant irrespective of the speed of the motor. In such arrangements it is possible for the motor to over-speed if it is accidentally brought to above synchronous speed or if it should drop its load. It is the object of this invention to eliminate this possibility by means of a novel system of control, in which the torque of the induction motor is reduced to zero at synchronous speed and in which the motor is converted into a generator at above synchronous speeds.

The novel features which I believe to be characteristic of my invention are set forth in the appended claims. My invention itself, however, will best be understood by reference to the accompanying drawing in which I have diagrammatically illustrated a control system in accordance with my invention.

Referring to the drawing in detail, 1 indicates the induction motor to be controlled receiving power from a source 2. Mounted on shaft 3 of motor 1 are the rotors of machines 4 and 5. Machine 4 is commonly called an "ohmic drop exciter", has its brushes 6 connected to slip rings 7 of motor 1 and receives its field excitation from an exciter 10. Machine 5 is a frequency converter having its slip rings 8 connected to source 2 through transformer 9. Exciter 10 is driven at constant speed by motor 11, having its brushes 13 connected to field 12 of the ohmic drop exciter 4. It has two field windings 14 and 15 of which field 14 is connected to brushes 16 of converter 5 and in series with resistors 17 to slip rings 7 of motor 1. Field 15 is connected to the secondary 18 of a transformer 19. Transformer 19 is similar to an induction voltage regulator having a rotatable primary 20 which is connected to the brushes 16 of converter 5 through resistors 21. Primary 20 is permitted to rotate 180 electrical degrees only, between stops 22 and 23. When motor 1 is running at sub-synchronous speed the primary 20 tends to rotate clockwise and rests against stop 22. As soon as the motor speed rises above synchronism however, the primary tends to rotate counter-clockwise and comes to rest against stop 23.

In operation the voltages impressed upon slip rings 7 are a resultant of the voltage delivered by ohmic drop exciter 4 and the voltage delivered by converter 5 connected to the slip rings through field 14 and resistor 17. Converter 5, through this connection, compensates for the losses in motor 1.

The voltage generated by ohmic drop exciter 4 may be considered as having two components. One of these is due to the action of field 14 on the constant speed exciter 10. This component is adjusted to be equal and opposite to the secondary voltage of motor 1 at all speeds of the motor. The second component is a result of the influence of field 15 upon the current generated by exciter 10 and therefore upon the excitation of field 12, and determines the torque of motor 1.

Field 15 is excited by the secondary 18 of transformer 19 the primary of which is excited from the brushes 16 of converter 5 through high resistances 21. Brushes 16 deliver current at a frequency which varies with the speed of the motor but becomes continuous at the synchronous speed. It is evident therefore that field 15 is deenergized at the synchronous speed of motor 1 and the torque component, impressed upon the slip rings 7 at sub-synchronous speeds, is eliminated.

If the motor should further increase its speed due to external causes and therefore reach super-synchronous speeds, the current in primary winding 20 will reverse and the winding will tend to rotate counter-clockwise. This rotation will be only 180 electrical degrees, the winding being held stationary by stop 23. In this position of the primary 20 the voltages induced in field 15 and therefore impressed upon slip rings 7 are reversed and, instead of producing torque generating currents, excite the rotor in a manner causing the motor to generate and feed back into the source 2.

What I claim as new and desire to secure by Letters Patent of the United States is:

1. The method of operating induction motors which consists in supplying to the secondary windings thereof an excitation voltage made up of two components, one component being substantially equal to the no-load secondary voltage of the induction motor at any speed, the second component supplying an additional excitation corresponding to the output torque of the motor, and reducing said second component to zero at synchronous speed.

2. In combination an induction machine, an exciter connected in cascade with the rotor of said machine, means for causing said exciter to supply a voltage having two components one of said components being equal to the no-load secondary voltage of the induction machine at any speed, the second component being proportional to and determining the torque of said machine, and means for eliminating said second component at synchronous speed of the induction machine.

3. In combination an induction machine together with means for supplying the secondary excitation thereof comprising an exciter connected in cascade with said induction machine, a field winding on said exciter, and means for supplying two excitation components to said field winding, one component being substantially proportional to the secondary no-load voltage of said induction machine at any speed, the second component being substantially proportional to and determining the output torque of said induction machine, means for reducing said second component to zero at synchronous speed of the machine, and means to reverse said component at above synchronous speed of the induction machine.

4. In combination an induction motor, a commutator machine connected in cascade with said motor, means for exciting said machine including a commutator exciter driven at substantially constant speed, two field windings for said exciter, means for exciting said fields comprising a converter capable of delivering direct current at its brushes at synchronous speed of the induction motor, a direct connection from the brushes of said converter to one of the fields of said exciter, and a transformer connection between the brushes of said converter and the second field of said exciter.

5. The method of operating induction motors which consists in supplying to the secondary windings thereof an excitation voltage made up of two components, one component being substantially equal to the no-load secondary voltage of the induction motor at any speed, the second component supplying an additional excitation corresponding to the output torque of the motor, reducing said second component to zero at synchronous speed, and reversing said second component at above synchronous speeds of the induction motor.

6. In combination an induction motor, a commutator machine connected in cascade with said motor, means for exciting said machine including a commutator exciter driven at substantially constant speed, two field windings for said exciter, means for exciting said fields comprising a converter capable of delivering direct current at its brushes at synchronous speed of the induction motor, a direct connection from the brushes of said converter to one of the fields of said exciter, and a transformer connection automatically reversible at synchronous speed of the motor between the brushes of said converter and the second field of said exciter.

In witness whereof, I have hereunto set my hand this 2nd day of August 1928.

EUGEN HANDSCHIN.